United States Patent
Zhu et al.

(10) Patent No.: US 12,052,735 B1
(45) Date of Patent: Jul. 30, 2024

(54) METHOD FOR OFFLOADING DECISION AND RESOURCE ALLOCATION BASED ON INTEGRATION OF COMMUNICATION, SENSING AND COMPUTING

(71) Applicant: NANJING UNIVERSITY OF POSTS AND TELECOMMUNICATIONS, Nanjing (CN)

(72) Inventors: Qi Zhu, Nanjing (CN); Shuo Sun, Nanjing (CN)

( * ) Notice: Subject to any disclaimer, the term of this patent is extended or adjusted under 35 U.S.C. 154(b) by 0 days.

(21) Appl. No.: 18/434,839

(22) Filed: Feb. 7, 2024

Related U.S. Application Data

(63) Continuation of application No. PCT/CN2023/117290, filed on Sep. 6, 2023.

(30) Foreign Application Priority Data

Feb. 15, 2023 (CN) .......................... 202310113909.7

(51) Int. Cl.
| | | |
|---|---|---|
| H04W 24/02 | (2009.01) |
| H04L 5/00 | (2006.01) |
| H04W 72/0446 | (2023.01) |
| H04W 72/52 | (2023.01) |
| H04W 72/541 | (2023.01) |

(52) U.S. Cl.
CPC .......... *H04W 72/52* (2023.01); *H04L 5/0062* (2013.01); *H04W 72/0446* (2013.01); *H04W 72/541* (2023.01)

(58) Field of Classification Search
CPC .............. H04W 72/52; H04W 72/541; H04W 72/0446; H04L 5/0062
See application file for complete search history.

(56) References Cited

FOREIGN PATENT DOCUMENTS

| | | | |
|---|---|---|---|
| CN | 110062026 A | | 7/2019 |
| CN | 111132077 A | | 5/2020 |
| CN | 114025360 A | * | 2/2022 |
| CN | 114375058 A | | 4/2022 |

(Continued)

OTHER PUBLICATIONS

Internation Search Report of PCT/CN2023/117290, Mailed Dec. 12, 2023.

*Primary Examiner* — Melvin C Marcelo

(57) ABSTRACT

A method for offloading decision and resource allocation based on integration of communication, sensing and computing is provided. A system cost function is defined by considering energy consumption, time delay, and migration costs. Under the constraints of user sensing failure rate and maximum task completion time delay, a long-term average cost minimization problem is established. Based on Lyapunov optimization theory, a virtual queue is established to evaluate the user sensing performance. By using Lyapunov drift-plus-penalty function, the long-term stochastic optimization problem is transformed into a deterministic optimization problem with a single time slot. The transformed problem is divided into inner and outer layers. The inner layer obtains the optimal task offloading ratio for each user base station selection and channel allocation through theoretical derivation. The outer layer determines the user base station selection and channel allocation based on the results of solving the inner layer problem through matching theory.

10 Claims, 4 Drawing Sheets

(56) References Cited

FOREIGN PATENT DOCUMENTS

| | | | |
|---|---|---|---|
| CN | 114885417 A | | 8/2022 |
| CN | 115568024 A | | 1/2023 |
| CN | 116233928 A | * | 6/2023 |
| WO | 2022121097 A1 | | 6/2022 |

* cited by examiner

METHOD FOR OFFLOADING DECISION AND RESOURCE ALLOCATION BASED ON INTEGRATION OF COMMUNICATION, SENSING AND COMPUTING

CROSS-REFERENCE

This application is a continuation of International Application No. PCT/CN2023/117290 with a filling date of Sep. 6, 2023, designating the United states, now pending, and further claims to the benefit of priority from Chinese Application No. 202310113909.7 with a filing date of Feb. 15, 2023. The content of the aforementioned applications, including any intervening amendments thereto, are incorporated herein by reference.

TECHNICAL FIELD

The present disclosure relates to the field of communication technology, in particular to an offloading decision and resource allocation method based on integration of communication, sensing and computing.

BACKGROUND

Mobile edge computing (MEC) provides computing, communication and storage capabilities at the network edge for users, significantly reducing transmission delay, enhancing computing capabilities, and helping to meet the needs of delay sensitive and computing intensive applications, such as video stream analysis, virtual reality, automatic driving, etc.

In mobile edge computing networks, offloading decisions mainly address the issues of what to offload, how to offload, and how many to offload. Resource allocation focuses on the joint management of system computing resources, storage resources, and communication resources. User offloading decisions and resource allocation will directly affect system performance, so it has become a research hotspot.

SUMMARY

Due to the development of millimeter wave communication, the spectra of communication and radar sensing gradually tends to overlap. As a key technology in future mobile communication, integrated sensing and communication (ISAC) integrates the hardware of sensing and communication, multiplexes the same frequency band, and uses the designed integrated signal for both sensing and communication, further utilizing scarce spectrum resources.

Therefore, in order to overcome the deficiencies of existing technologies, the present disclosure provides an offloading decision and resource allocation method based on integration of communication, sensing and computing. This method considers the impact of user mobility on performance and integrated sensing and communication in a MEC network with multi-user and multi-edge nodes, minimizing user energy consumption, task delay, and migration cost.

Technical solution: To solve the above technical problems, the technical solution adopted by the present disclosure is:

In the first aspect, a method for offloading decision and resource allocation based on integration of communication, sensing and computing is provided by the present disclosure, and the method are executed the following steps according to a preset cycle:

S1. obtaining a location, a channel status, a task data volume, a virtual queue backlog of each user in a current time slot, and an user base station selection from a previous time slot of each user, wherein each channel of each base station is recorded as a base station-channel pair, and when an user accesses a channel of a base station, recording as a mutual matching between the user and the base station-channel pair;

S2. based on the location, the channel status, the task data volume, the virtual queue backlog of each user in the current time slot, and the user base station selection in the previous time slot of each user, performing an initial matching according to a preference value of the user to the base station-channel pair and a preference value of the base station-channel pair to the user to obtain an initial matching result;

S3. performing an swap matching based on the initial matching result to obtain an swap matching result;

S4. determining an user base station selection, a channel allocation, and a task offloading ratio of the current time slot based on the swap matching result.

In some embodiments, performing an initial matching according to a preference value of the user to the base station-channel pair and a preference value of the base station-channel pair to the user of S2, including:

S2.1. setting an initial matched user set as an empty set, an initial unmatched user set as a set consisting of all users, an initial current matching set as an empty set, an initial unmatched base station-channel pair set as a set consisting of each channel of each base station, and an initial matched base station-channel pair set as an empty set;

S2.2. computing the preference values of the user to all unmatched base station-channel pairs in a certain order under the current matching, and sending a matching request to the unmatched base station-channel pair with the highest preference value;

S2.3. computing the preference values of all unmatched base station-channel pairs to each requesting user in a certain order under the current matching, the unmatched base station-channel pair accepts the matching request from the user with the highest preference value to reaching an initial matching;

S2.4. updating the current matching, the matched user set, the unmatched user set, the unmatched base station-channel pair, and the matched base station-channel pair set;

S2.5. repeating steps S2.2-S2.4 until all users are matched with a certain base station-channel pair, then an initial matching stage is end, and an initial matching result is obtained, wherein the initial matching result includes: the current matching, the matched user set, the unmatched user set, the unmatched base station-channel pair, and the matched base station-channel pair set.

In some embodiments, performing an swap matching based on the initial matching result to obtain an swap matching result of S3, including:

S3.1. recording the current matching as a pre-swap matching, and starting a round of swap matching;

S3.2. performing detection of a swap closed pair on all base station-channel pairs in a certain order for the current matched users;

S3.3. if any two users satisfy the swap closed pair, swapping the base station-channel pair matched by the two users;

S3.4. updating the current matching;

S3.5. completing one round of swap matching when all users have completed detection, and recording the current matching as an after-swap matching;

S3.6. repeating steps S3.1-S3.5 until the pre-swap matching and the after-swap matching of each round of swap is the same, and the swap matching is completed to obtain the swap matching result.

In some embodiments, obtaining the location, the channel status, the task data volume, and the virtual queue backlog of each user in the current time slot in step S1, including:

S1.1. there are a total of N of base stations, M of users, and L of channels in the system, wherein the set of base stations is represented as N={1, 2, 3 . . . , N}, the set of users is represented as M={1,2,3, . . . , M}, and the set of channels is represented as L={1, 2, 3 . . . , L}; when the user is in a movement state, to represent the movement of the user, time is discretized into time slots, and a length of one time slot is $\tau$; assuming that the position of the user remains unchanged within one time slot and varies in different time slots; time slots are represented as a set T={1,2,3, . . . , t, . . . }; each user has a service consisting of a series of tasks, and an exclusive virtual machine or container is built on an edge server to process generated tasks; as the user moves, the virtual machine or the container migrates with the switching of the base station to which the user is accessed; the user generates one task in each time slot, and the amount of data required for communication in the task generated in the time slot t from the user m is represented as $I_m(t)$; the task computation load is represented as $C_m(t)$; the task requesting maximum time delay is represented as $D_m(t)$, and $D_m(t) \leq \tau$; the task offloading ratio is represented as $\rho_m(t)$, and $\rho_m(t) \in [\rho_{min}, 1]$; a portion of the task is calculated locally, and a portion is calculated at the base station; an user accesses to a base station at every time slot to offload task data; the users are able to use integrated signals of communication and sensing to sense the surrounding environment when transmitting task data to the base station in each time slot; all base stations share the same multiple channels, and both large-scale fading and small-scale fading of the channels are considered at the same time;

S1.2. $a_m^n(t)$ denotes the association between the user m and the base station n in the time slot t, when the user m accesses the base station n in the time slot t, $a_m^n(t)=1$, otherwise $a_m^n(t)$ is 0; all base stations share L of channels, a bandwidth of each channel is equal as w, and the signals of users using the same channel interfere with each other; $b_m^l(t)$ denotes the usage of the user m of the channel l during the time slot t, when the user m occupies the channel l during the time slot t, $b_m^l(t)=1$, otherwise $b_m^l(t)$ is 0; users are only accessed to one base station in one time slot, occupying one channel;

S1.3. using the conditional mutual information between echo signals and channel pulse responses to measure the user sensing performance of the surrounding environment, and the conditional mutual information $MI_m(t)$ of the user m in the time slot t is represented as:

$$MI_m(t) = \sum_{l \in L} b_m^l(t) \frac{1}{2} KT_s W \log_2(1 + \Gamma_m^l(t))$$

wherein, $\Gamma_m^l(t)$ denotes the radar signal-to-noise ratio of the user m on the channel l of the time slot t, expressed as:

$$\Gamma_m^l(t) = \frac{P_m K T_s^2 |V_m^l(f^l)|^2}{\sum_{m' \in M \square \{m\}} b_{m'}^l(t) P_{m'} h_{m',m}^l(t) + \sigma^2}$$

wherein, $P_m$ denotes the transmission power of the user m; K denotes the number of symbols in the integrated signal; $T_s$ denotes the duration of one symbol, $V_m^l(f^l)$ denotes the Fourier transform of the channel pulse response at the frequency $f^l$ of the channel l, following a standard normal distribution; $h_{m',m}^l(t)$ denotes the channel gain between user m' and the user m on the channel l; and $\sigma^2 = N_0 W$ denotes the power of additive Gaussian white noise in the channel;

when the user mutual information is less than the set threshold value $MI_{min}$, sensing fails, expressed as:

$$S_m(t) = \text{indicator}_{\{MI_m(t) < MI_{min}\}}$$

wherein $\text{indicator}_{\{x\}}$ denotes an indicator function, that is, when the expression x is true, the value of the indicator function is 1, otherwise it is 0;

S1.4. for sensing failure event $S_m(t)$ of the user m in time slot t, defining a corresponding virtual queue with an initial value of 0, and representing the backlog of each queue as $Q_m(t)$, wherein $Q_m(0)=0$, $S_m(t)$ denotes the increase of virtual queues in time slot t, and $\delta$ denotes the decrease of virtual queues; the virtual queue backlog of the user m in time slot t+1 satisfies the following expression:

$$Q_m(t+1) = [Q_m(t) + S_m(t) - \delta]^+.$$

In some embodiments, a method for computing the preference values of the user to all unmatched base station-channel pairs in a certain order under the current matching in step S2 includes:

the data transmission rate $R_m^{Tr}(t)$ at which the user m offloads tasks to the base station during the time slot t is expressed as:

$$R_m^{Tr}(t) = \sum_{n \in N} \sum_{l \in L} a_m^n(t) b_m^l(t) W \log_2 \left(1 + \frac{P_m h_{m,n}^l(t)}{\sum_{m' \in M \square \{m\}} b_{m'}^l(t) P_{m'} h_{m',n}^l(t) + \sigma^2}\right)$$

wherein, $h_{m',n}^l(t)$ denotes the channel gain between the user m' and the base station n on the channel l, and $$\sum_{m' \in M \square \{m\}} b_{m'}^l(t) P_{m'} h_{m',n}^l(t)$$

denotes the interference caused by other users using the same channel to the user m;

the time $T_m^{Tr}(t)$ for the user m to transmit tasks in the time slot t is expressed as:

$$T_m^{Tr}(t) = \frac{I_m(t) \rho_m(t)}{R_m^{Tr}(t)}$$

the energy consumption $E_m^{Tr}(t)$ of the user m transmitting tasks in the time slot t is expressed as:

$$E_m^{Tr}(t)=P_m T_m^{Tr}(t)$$

using $f_{m,local}$ to represent the computing power of the user m, the local computation time delay $T_m^{local}(t)$ of the user m for tasks in the time slot t is:

$$T_m^{local}(t) = \frac{C_m(t)(1-\rho_m(t))}{f_{m,local}}$$

the local task computation energy consumption $E_m^{local}(t)$ of the user m in the time slot t is:

$$E_m^{local}(t)=K(1-\rho_m(t))C_m(t)f_{m,local}^2$$

wherein, K refers to the power coefficient;
after receiving the task transmitted by the user, the base station divides all computing resources equally among the computing tasks of all users, and the computing resource m allocated to the user m by the base station n in the time slot t is:

$$f_m^n(t) = \frac{a_m^n(t)F_n}{\sum_{m\in M} a_m^n(t)}$$

the computing resource $f_m(t)$ obtained by the user m in the time slot t is expressed as:

$$f_m(t) = \sum_{n\in N} f_m^n(t)$$

the task computation time delay $T_m^{com}(t)$ for the user m in the time slot t is expressed as:

$$T_m^{com}(t) = \frac{C_m(t)\rho_m(t)}{f_m(t)}$$

the task processing time delay $T_m(t)$ of the user m in the time slot t is the maximum value of the local computation time delay and the base station computation time delay, expressed as:

$$T_m(t)=\max\{T_m^{local}(t), T_m^{Tr}(t)+T_m^{com}(t)\}$$

the energy consumption $E_m(t)$ of the user m processing tasks in the time slot t is expressed as:

$$E_m(t)=E_m^{local}(t)+E_m^{Tr}(t)$$

the migration cost for the user m in the time slot t is expressed as:

$$c_m^{mi}(t) = \sum_{n\in N} \frac{\varepsilon}{2}[(1-a_m^n(t-1))a_m^n(t)+(1-a_m^n(t))a_m^n(t-1)]$$

wherein, $\varepsilon$ denotes the cost of migration, which is a fixed value; when the base station selections selected by the user of the current time slot and the previous time slot are different, there is a migration cost $\varepsilon$, otherwise there is no cost;

the cost function $U_m(t)$ of the user m in the time slot t is expressed as:

$$U_m(t)=\alpha T_m(t)+\beta E_m(t)+c_m^{mi}(t)$$

wherein, $\alpha,\beta$ are the weight coefficients of time delay and energy consumption, respectively;
establishing an optimization problem P1 that minimize long-term user costs:

$$P1: \min_{A,B,\rho} \lim_{i\to\infty} \frac{\sum_{t=1}^{i}\sum_{m\in M} E[U_m(t)]}{i}$$

$$\text{s.t.} \sum_{n\in N} a_m^n(t) = 1, \forall m \in M, t \in T \quad (C1)$$

$$\sum_{l\in L} b_m^l(t) = 1, \forall m \in M, t \in T \quad (C2)$$

$$\sum_{m\in M} a_m^n(t)b_m^l(t) = 1, \forall n \in N, l \in L, t \in T \quad (C3)$$

$$\lim_{i\to\infty} \frac{\sum_{t=1}^{i} E[S_m(t)]}{i} \leq \delta, \forall m \in M \quad (C4)$$

$$T_m(t) \leq D_m(t), \forall m \in M, t \in T \quad (C5)$$

$$\rho_m(t) \in [\rho_{min}, 1], \forall m \in M, t \in T \quad (C6)$$

$$a_m^n(t), b_m^l(t) \in \{0,1\}, \forall m \in M, n \in N, l \in L, t \in T \quad (C7)$$

wherein, the variable set $A=\{a_m^n(t)|m\in M, n\in N, t\in T\}$ represents the access situation of each user to each base station in each time slot, $B=\{b_m^l(t)|m\in M, l\in L, t\in T\}$ represents the occupation situation of each channel by each user in each time slot, and $\rho=\{\rho_m(t)|m\in M, t\in T\}$ represents the task allocation ratio of each user in each time slot; constraints (C1) and (C2) represent that in each time slot, one user is only able to select one base station to access and only occupy one channel; constraint (C3) represents that one channel of one base station is only used by at most one user within one time slot; constraint (C4) represents that the average time of the expected value $E[S_m(t)]$ of sensing failure event of the user is less than a certain set value $\delta$, that is, the long-term sensing failure rate of users is below a certain threshold; constraint (C5) represents that each user task are required to complete within the maximum time delay $D_m(t)$; constraint (C6) represents that each user task in each time slot is arbitrarily divided between the minimum value $\rho_{min}$ and 1; constraint (C7) represents that variables of the base station selection and the channel allocation are binary variables;
transforming the optimization problem P1 into an optimization problem P2 through Lyapunov optimization theory:

$$P2: \min_{A(t),B(t),\rho(t)} z + \sum_{m\in M} Q_m(t)S_m(t) + V\sum_{m\in M} U_m(t)$$

$$\text{s.t.} \sum_{n\in N} a_m^n(t) = 1, \forall m \in M \quad (C1)$$

$$\sum_{l\in L} b_m^l(t) = 1, \forall m \in M \quad (C2)$$

$$\sum_{m\in M} a_m^n(t)b_m^l(t) = 1, \forall n \in N, l \in L \quad (C3)$$

$$T_m(t) \leq D_m(t), \forall m \in M \quad (C4)$$

-continued $$\rho_m(t) \in [\rho_{min}, 1], \forall\, m \in M \quad (C5)$$

$$a_m^n(t), b_m^l(t) \in \{0, 1\}, \forall\, m \in M, n \in N, l \in L \quad (C6)$$

wherein, $Q_m(t)$ is the virtual queue backlog of the user m in the time slot t, $S_m(t)$ is the sensing failure event of the user m in time slot t, $$z = \frac{1}{2}(M + M\delta^2)$$

is a constant, and V is the control parameter that balances the stability of virtual queues with the sum of user cost functions;

solving the optimization problem P2 to obtain the values of the base station selection $a_m^n(t)$ and channel allocation $b_m^l(t)$ corresponding to the current matching of the user;

after the base station selection of the user and the channel allocation are determined, simplifying the optimization problem P2 into an optimization problem P2.1:

$$P2.1: \quad \min_{\rho(t)} z + \sum_{m \in M} Q_m(t) S_m(t) + V \sum_{m \in M} U_m(t)$$

$$\text{s.t.} \quad T_m(t) \leq D_m(t), \forall\, m \in M \quad (C5)$$

$$\rho_m(t) \in [\rho_{min}, 1], \forall\, m \in M \quad (C6)$$

solving the optimization problem P2.1 to obtain the user task offloading ratio under the current matching;
let $F_0 = 1 - D_m(t) f_{m,local}/C_m(t)$, $$F_1 = D_m(t) / \left( \frac{I_m(t)}{R_m^{Tr}(t)} + \frac{C_m(t)}{f_m(t)} \right),$$

when $F_0 > F_1$ or $F_1 < \rho_{min}$, there is no solution to the problem P2.1, otherwise, there is an optimal solution of the problem P2.1, i.e. the user task offloading ratio, expressed as:

$$\rho_m^*(t) = \begin{cases} \max\{F_0, \rho_{min}\}, & \text{if } F_2 \geq 0 \text{ and } F_3 < \rho_{min} \\ \max\{1, F_1\}, & \text{if } F_2 < 0 \text{ and } F_3 < \rho_{min} \\ \rho_{m,1}(t), & \text{if } F_3 \geq \rho_{min} \text{ and } f_1(m,t) \leq f_2(m,t) \\ \rho_{m,2}(t), & \text{if } F_3 \geq \rho_{min} \text{ and } f_1(m,t) \geq f_2(m,t) \end{cases}$$

wherein $$F_2 = \alpha \left( \frac{I_m(t)}{R_m^{Tr}(t)} + \frac{C_m(t)}{f_m(t)} \right) - \beta K s C_m(t) f_{m,local}^2 + \beta \frac{P_m I_m(t)}{R_m^{Tr}(t)}$$

$$F_3 = \frac{C_m(t)}{f_{m,local}} / \left( \frac{C_m(t)}{f_{m,local}} + \frac{C_m(t)}{f_m(t)} + \frac{I_m(t)}{R_m^{Tr}(t)} \right)$$

$$F_4 = \beta \frac{P_m I_m(t)}{R_m^{Tr}(t)} - \beta K C_m(t) f_{m,local}^2 - \alpha \frac{C_m(t)}{f_{m,local}}$$

$$\rho_{m,1}(t) = \begin{cases} \max\{\rho_{min}, F_0\}, & \text{if } F_4 \geq 0 \\ \min\{F_1, F_3, 1\}, & \text{if } F_4 < 0 \end{cases}$$

$$\rho_{m,2}(t) = \begin{cases} \max\{F_0, \rho_{min}, F_3\}, & \text{if } F_2 \geq 0 \\ \min\{1, F_1\}, & \text{if } F_2 < 0 \end{cases}$$

$$f_1(m, t) = \alpha(1 - \rho_{m,1}(t)) C_m(t) / f_{m,local} + \beta\big((1 - \rho_{m,1}(t)) K C_m(t) f_{m,local}^2 + P_m \rho_{m,1}(t) I_m(t) / R_m^{Tr}(t)\big)$$

$$f_2(m, t) = \alpha \left( \frac{\rho_{m,2}(t) I_m(t)}{R_m^{Tr}(t)} + \frac{\rho_{m,2}(t) C_m(t)}{f_m(t)} \right) + \beta\big((1 - \rho_{m,2}(t)) K C_m(t) f_{m,local}^2 + P_m \rho_{m,2}(t) I_m(t) / R_m^{Tr}(t)\big)$$

based on the user task offloading ratio obtained from the solution, computing the the preference value of the user to the base station-channel pair and the preference value of the base station-channel pair to the user under the current matching;

the preference value $P_m(v,t)$ of the user $m \in M$ to the base station-channel pair under the current matching v in the time slot t is:

$$P_m(v,t) = \text{indicator}_{\{Iv_m(t)=1\}} * (\eta - (z + Q_m(t) S_m(t) + V U_m(t)))$$

wherein, $Iv_m(t)=1$ indicates that the user m has a solution to the inner layer problem in the time slot t, that is, the maximum time delay constraint is satisfied. otherwise $Iv_m(t)$ is taken 0, and $\eta$ is a positive number with a very large order of magnitude;

the preference values $P_y(v,t)$ for users in the current matching v of the base station-channel pair in the time slot t are:

$$P_y(v, t) = \sum_{m \in M} P_m(v, t).$$

In some embodiments, the detection of a swap closed pair on all base station-channel pairs in a certain order for the current matched users in step S3.2, includes:

under the current matching, setting two users swap the matched base station-channel pairs, while other users maintain the current matched base station-channel pairs;

if after the two users swap the matched base station-channel pairs, both of the preference values of the user to the base station-channel pair and the preference values of base station-channel pair to the user increase, then these two users satisfy the current matched swap closed pair.

In some embodiments, the preset period is a length of one time slot.

The second aspect, the present disclosure provides an offloading decision and resource allocation device based on integration of communication, sensing and computing, including a processor and a storage medium;

The storage medium is configured to store instructions;

The processor is configured to operate according to the instructions to execute the steps of the method according to the first aspect.

The third aspect, the present disclosure provides a storage medium on which a computer program is stored, and the steps of implementing the method described in the first aspect when the computer program is executed by the processor.

The fourth aspect, the present disclosure provides a computing device including:

One or more processors, one or more memories, and one or more programs, wherein one or more programs are stored in the one or more memories and configured to be executed by the one or more processors, and the one or more programs comprising instructions for executing any one of the methods described in the first aspect.

Advantageous effects: Compared to prior art, the advantages of the present disclosure are shown as below:
1. In the MEC network with multi-user and multi-edge nodes, considering the mobility of users, when users switch from one base station to another, their services can be migrated to the computing nodes of the new base station for processing, and the tasks are partially offloaded. During the communication process of task offloading, the integrated signal is used to analyze the echo of the integrated signal reflected by the surrounding environment to sense the environment. Under the constraints of long-term sensing failure rate and maximum task completion delay of users, a system cost function is defined by considering energy consumption, delay, and migration cost, and a long-term average cost minimization problem for users is established.
2. The established optimization problem is a long-term stochastic optimization problem. Based on Lyapunov optimization theory, a virtual queue is established for the user sensing performance, and a related Lyapunov drift-plus-penalty function is defined, by using its upper bound, the long-term stochastic optimization problem is transformed into a deterministic optimization problem with a single time slot.
3. The single time slot problem is solved by dividing it into two layers: an inner layer and an outer layer. The inner layer obtains the optimal task offloading ratio for each user base station selection and channel allocation through theoretical derivation, while the outer layer designs a "preference value" to evaluate the current user base station selection and channel allocation based on the solution of the inner layer problem. Based on matching theory, it iteratively converges to the final base station selection and channel allocation.

DETAILED DESCRIPTION OF THE EMBODIMENTS

The present disclosure will be further described in conjunction with the accompanying drawings. The following embodiments are only intended to provide a clearer illustration of the technical solution of the present disclosure and cannot be used to limit the scope of the present disclosure.

In the description of the present disclosure, the reference terms "one embodiment", "some embodiments", "illustrative embodiments", "example", "specific examples" or "some examples" etc. refer to specific features, structures, materials, or features described in conjunction with the embodiments or examples included in at least one embodiment or example of the present disclosure. In this disclosure, the illustrative expressions of the above terms may not necessarily refer to the same embodiments or examples. Moreover, the specific features, structures, materials, or features described can be combined in an appropriate manner in any one or more embodiments or examples.

Embodiment 1

A method for offloading decision and resource allocation based on integration of communication, sensing and computing is provided, which includes the following steps:
S1. obtaining a location, a channel status, a task data volume, a virtual queue backlog of each user in a current time slot, and an user base station selection from a previous time slot of each user, wherein each channel of each base station is recorded as a base station-channel pair, and when an user accesses a channel of a base station, recording as a mutual matching between the user and the base station-channel pair;
S2. based on the location, the channel status, the task data volume, the virtual queue backlog of each user in the current time slot, and the user base station selection in the previous time slot of each user, performing an initial matching according to a preference value of the user to the base station-channel pair and a preference value of the base station-channel pair to the user to obtain an initial matching result;
S3. performing an swap matching based on the initial matching result to obtain an swap matching result;
S4. determining an user base station selection, a channel allocation, and a task offloading ratio of the current time slot based on the swap matching result.

Figure 1:
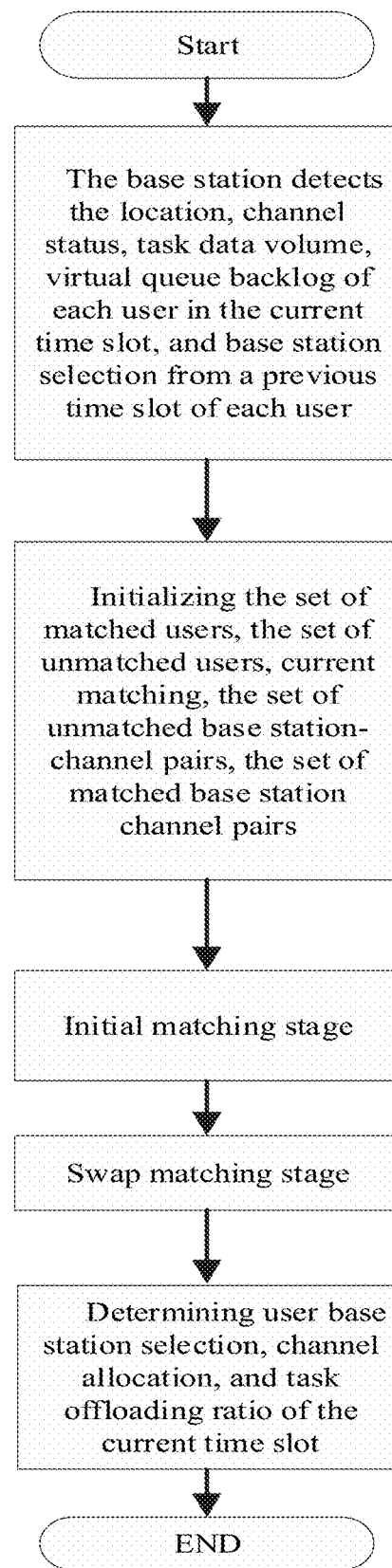
FIG. 1 is a flowchart of a method according to an embodiment of the present disclosure.

In some specific embodiments, as shown in FIG. 1, a method for offloading decision and resource allocation based on integration of communication, sensing and computing, including:
S1. obtaining a location, a channel status, a task data volume, a virtual queue backlog of each user in a current time slot, and an user base station selection from a previous time slot of each user, wherein each channel of each base station is recorded as a base station-channel pair, and when an user accesses a channel of a base station, recording as a mutual matching between the user and the base station-channel pair.

Figure 4:
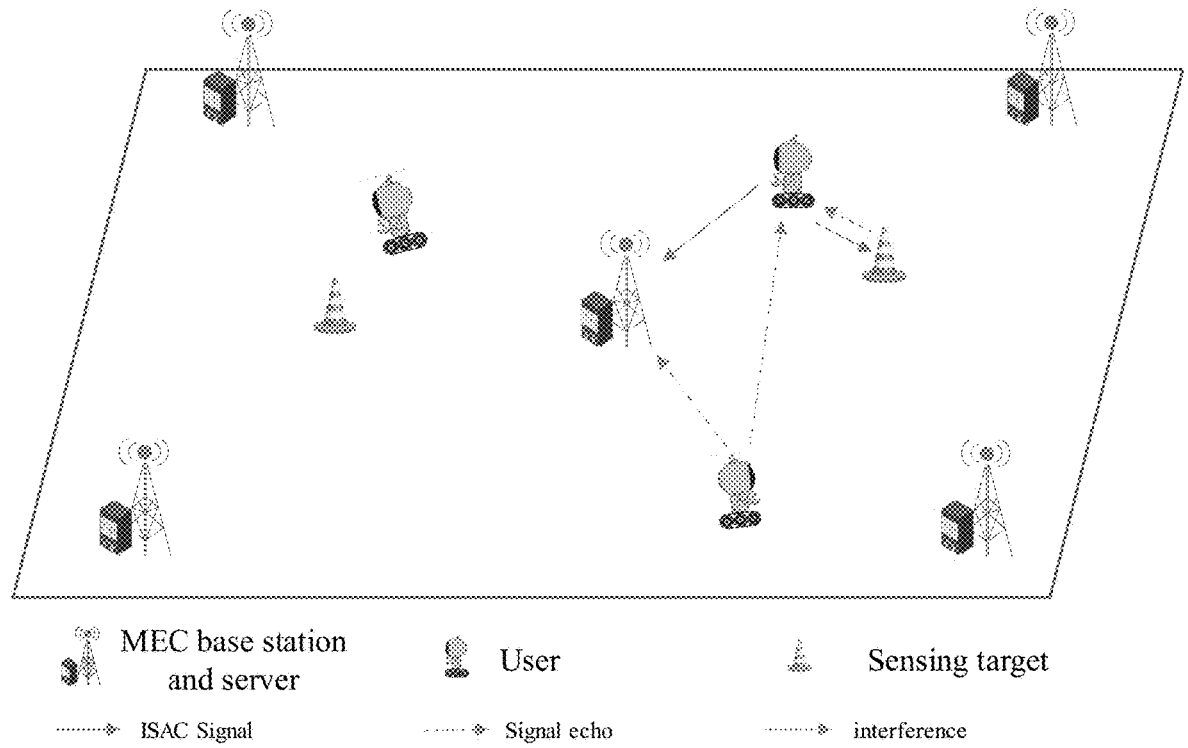
FIG. 4 is a schematic diagram of the system model provided according to an embodiment of the present disclosure.

In some specific embodiments, obtaining the location, the channel status, the task data volume, and the virtual queue backlog of each user in the current time slot in step S1, including:
S1.1. as shown in FIG. 4, there are a total of N of base stations, M of users, and L of channels in the system, wherein the set of base stations is represented as N={1, 2, 3 . . . , N}, the set of users is represented as M={1,2,3, . . . , M}, and the set of channels is represented as L={1, 2, 3 . . . , L}; when the user is in a movement state, to represent the movement of the user, time is discretized into time slots, and a length of one time slot is $\tau$; assuming that the position of the user remains unchanged within one time slot and varies in different time slots; time slots are represented as a set T={1,2,3, . . . , t, . . . }; each user has a service consisting of a series of tasks, and an exclusive virtual machine or container is built on an edge server to process generated tasks; as the user moves, the virtual machine or the container migrates with the switching of the base station to which the user is accessed; the user generates one task in each time slot, and the amount of data required for communication in the task generated in the time slot t from the user m is represented as $I_m(t)$; the task computation load is represented as $C_m(t)$; the task requesting maximum time delay is represented as $D_m(t)$, and $D_m(t) \leq \tau$; the task offloading ratio is represented as $\rho_m(t)$, and $\rho_m(t) \in [\rho_{min}, 1]$; a portion of the task is calculated locally, and a portion is calculated at the base station; an user accesses to a base station at every time slot to offload task data; the users are able to use integrated signals of communication and sensing to sense the surrounding environment when transmitting task data to the base station in each time slot; all base stations share the same multiple channels, and both large-scale fading and small-scale fading of the channels are considered at the same time;

S1.2. $a_m^n(t)$ denotes the association between the user m and the base station n in the time slot t, when the user m accesses the base station n in the time slot t, $a_m^n(t)=1$, otherwise $a_m^n(t)$ is 0; all base stations share L of channels, a bandwidth of each channel is equal as W, and the signals of users using the same channel interfere with each other; $b_m^l(t)$ denotes the usage of the user m of the channel l during the time slot t, when the user m occupies the channel l during the time slot t, $b_m^l(t)=1$, otherwise $b_m^l(t)$ is 0; the user are only accessed to one base station in one time slot, occupying one channel;

S1.3. using the conditional mutual information between echo signals and channel pulse responses to measure the user sensing performance of the surrounding environment, and the conditional mutual information $MI_m(t)$ of the user m in the time slot t is represented as:

$$MI_m(t) = \sum_{l \in L} b_m^l(t) \frac{1}{2} KT_s W \log_2\left(1 + \Gamma_m^l(t)\right)$$

wherein, $\Gamma_m^l(t)$ denotes the radar signal-to-noise ratio of the user m on the channel l of the time slot t, expressed as:

$$\Gamma_m^l(t) = \frac{P_m K T_s^2 |V_m^l(f^l)|^2}{\sum_{m' \in M \square \{m\}} b_{m'}^l(t) P_{m'} h_{m',m}^l(t) + \sigma^2}$$

wherein, $P_m$ denotes the transmission power of the user m; K denotes the number of symbols in the integrated signal; $T_s$ denotes the duration of one symbol, $V_m^l(f^l)$ denotes the Fourier transform of the channel pulse response at the frequency $f^l$ of the channel l, following a standard normal distribution; $h_{m',m}^l(t)$ denotes the channel gain between user m' and the user m on the channel l; and $\sigma^2 = N_0 W$ denotes the power of additive Gaussian white noise in the channel;

when the user mutual information is less than the set threshold value $MI_{min}$, sensing fails, expressed as:

$S_m(t) = \text{indicator}_{\{MI_m(t) < MI_{min}\}}$, wherein $\text{indicator}_{\{x\}}$ denotes an indicator function, that is, when the expression x is true, the value of the indicator function is 1, otherwise it is 0;

S1.4. for sensing failure event $S_m(t)$ of the user m in time slot t, defining a corresponding virtual queue with an initial value of 0, and representing the backlog of each queue as $Q_m(t)$, wherein $Q_m(0)=0$, $S_m(t)$ denotes the increase of virtual queues in time slot t, and $\delta$ denotes the decrease of virtual queues; the virtual queue backlog of the user m in time slot t+1 satisfies the following expression:

$Q_m(t+1) = [Q_m(t) + S_m(t) - \delta]^+$.

S2. based on the location, the channel status, the task data volume, the virtual queue backlog of each user in the current time slot, and the user base station selection in the previous time slot of each user, performing an initial matching according to a preference value of the user to the base station-channel pair and a preference value of the base station-channel pair to the user to obtain an initial matching result.

Figure 2:
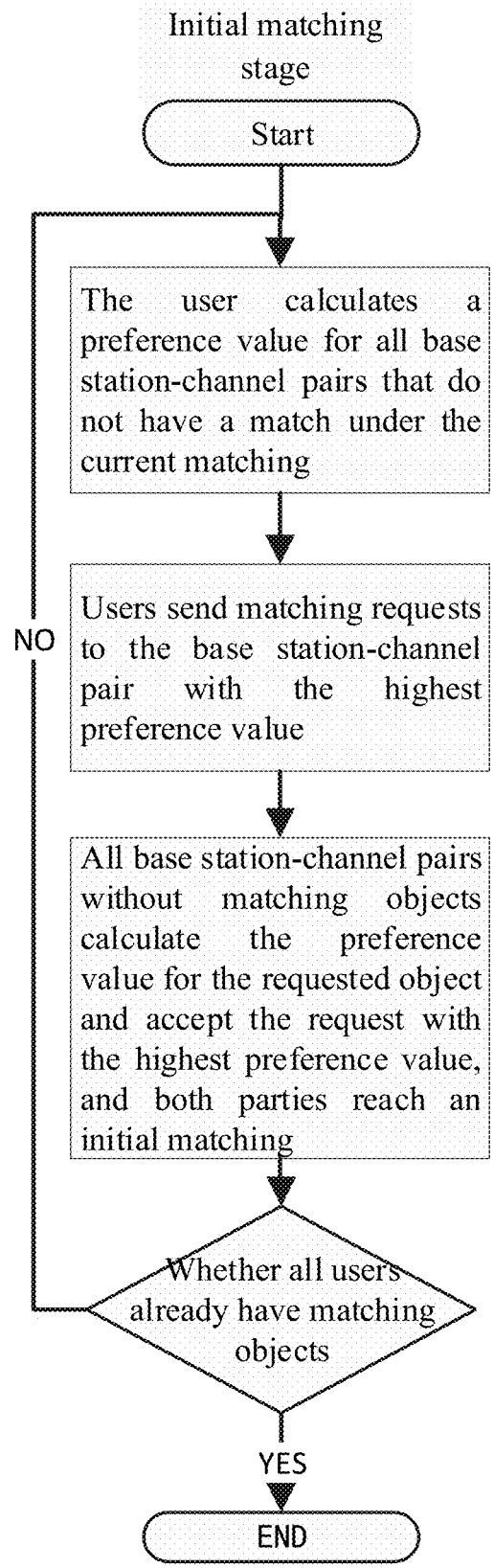
FIG. 2 is a flowchart illustrating the initial matching stage according to an embodiment of the present disclosure.

In some specific embodiments, as shown in FIG. 2, performing an initial matching according to a preference value of the user to the base station-channel pair and a preference value of the base station-channel pair to the user of S2, including:

S2.1. setting an initial matched user set as an empty set, an initial unmatched user set as a set consisting of all users, an initial current matching set as an empty set, an initial unmatched base station-channel pair set as a set consisting of each channel of each base station, and an initial matched base station-channel pair set as an empty set;

S2.2. computing the preference values of the user to all unmatched base station-channel pairs in a certain order under the current matching, and sending a matching request to the unmatched base station-channel pair with the highest preference value;

S2.3. computing the preference values of all unmatched base station-channel pairs to each requesting user in a certain order under the current matching, the unmatched base station-channel pair accepts the matching request from the user with the highest preference value to reaching an initial matching;

S2.4. updating the current matching, the matched user set, the unmatched user set, the unmatched base station-channel pair, and the matched base station-channel pair set;

S2.5. repeating steps S2.2-S2.4 until all users are matched with a certain base station-channel pair, then an initial matching stage is end, and an initial matching result is obtained, wherein the initial matching result comprises: the current matching, the matched user set, the unmatched user set, the unmatched base station-channel pair, and the matched base station-channel pair set.

Wherein, a method for computing the preference values of the user to all unmatched base station-channel pairs in a certain order under the current matching in step S2 includes:

the data transmission rate $R_m^{Tr}(t)$ at which the user m offloads tasks to the base station during the time slot t is expressed as:

$$R_m^{Tr}(t) = \sum_{n \in N} \sum_{l \in L} a_m^n(t) b_m^l(t) W \log_2 \left(1 + \frac{P_m h_{m,n}^l(t)}{\sum_{m' \in M \square \{m\}} b_{m'}^l(t) P_{m'} h_{m',n}^l(t) + \sigma^2}\right)$$

wherein, $h_{m',n}^l(t)$ denotes the channel gain between the user m' and the base station n on the channel l, and $$\sum_{m' \in M \square \{m\}} b_{m'}^l(t) P_{m'} h_{m',n}^l(t)$$

denotes the interference caused by other users using the same channel to the user m;

the time $T_m^{Tr}(t)$ for the user m to transmit tasks in the time slot t is expressed as:

$$T_m^{Tr}(t) = \frac{I_m(t)\rho_m(t)}{R_m^{Tr}(t)} \quad 5$$

the energy consumption $E_m^{Tr}(t)$ of the user m transmitting tasks in the time slot t is expressed as:

$$E_m^{Tr}(t) = P_m T_m^{Tr}(t)$$

using $f_{m,local}$ to represent the computing power of the user m, the local computation time delay $T_m^{local}(t)$ of the user m for tasks in the time slot t is:

$$T_m^{local}(t) = \frac{C_m(t)(1 - \rho_m(t))}{f_{m,local}}$$

the local task computation energy consumption $E_m^{local}(t)$ of the user m in the time slot t is:

$$E_m^{local}(t) = K(1-\rho_m(t))C_m(t)f_{m,local}^2$$

wherein, K refers to the power coefficient;
after receiving the task transmitted by the user, the base station divides all computing resources equally among the computing tasks of all users, and the computing resource m allocated to the user m by the base station n in the time slot t is:

$$f_m^n(t) = \frac{a_m^n(t)F_n}{\sum_{m\in M} a_m^n(t)}$$

the computing resource $f_m(t)$ obtained by the user m in the time slot t is expressed as:

$$f_m(t) = \sum_{n\in N} f_m^n(t)$$

the task computation time delay $T_n^{com}(t)$ for the user m in the time slot t is expressed as:

$$T_m^{com}(t) = \frac{C_m(t)\rho_m(t)}{f_m(t)}$$

the task processing time delay $T_m(t)$ of the user m in the time slot t is the maximum value of the local computation time delay and the base station computation time delay, expressed as:

$$T_m(t) = \max\{T_m^{local}(t), T_m^{Tr}(t) + T_m^{com}(t)\}$$

the energy consumption $E_m(t)$ of the user m processing tasks in the time slot t is expressed as:

$$E_m(t) = E_m^{local}(t) + E_m^{Tr}(t)$$

the migration cost for the user m in the time slot t is expressed as:

$$c_m^{mi}(t) = \sum_{n\in N} \frac{\varepsilon}{2}[(1 - a_m^n(t-1))a_m^n(t) + (1 - a_m^n(t))a_m^n(t-1)]$$

wherein, ε denotes the cost of migration, which is a fixed value; when the base station selections selected by the user of the current time slot and the previous time slot are different, there is a migration cost ε, otherwise there is no cost;
the cost function $U_m(t)$ of the user m in the time slot t is expressed as:

$$U_m(t) = \alpha T_m(t) + \beta E_m(t) + c_m^{mi}(t)$$

wherein, α,β are the weight coefficients of time delay and energy consumption, respectively;
establishing an optimization problem P1 that minimize long-term user costs:

$$P1: \min_{A,B,\rho} \lim_{i\to\infty} \frac{\sum_{t=1}^{i}\sum_{m\in M} E[U_m(t)]}{i}$$

s.t. $\sum_{n\in N} a_m^n(t) = 1, \forall m \in M, t \in T$ (C1)

$\sum_{l\in L} b_m^l(t) = 1, \forall m \in M, t \in T$ (C2)

$\sum_{m\in M} a_m^n(t)b_m^l(t) = 1, \forall n \in N, l \in L, t \in T$ (C3)

$\lim_{i\to\infty} \frac{\sum_{t=1}^{i} E[S_m(t)]}{i} \leq \delta, \forall m \in M$ (C4)

$T_m(t) \leq D_m(t), \forall m \in M, t \in T$ (C5)

$\rho_m(t) \in [\rho_{min}, 1], \forall m \in M, t \in T$ (C6)

$a_m^n(t), b_m^l(t) \in \{0, 1\}, \forall m \in M, n \in N, l \in L, t \in T$ (C7)

wherein, the variable set $A=\{a_m^n(t)|m\in M, n\in N, t\in T\}$ represents the access situation of each user to each base station in each time slot, $B=\{b_m^l(t)|m\in M, l\in L, t\in T\}$ represents the occupation situation of each channel by each user in each time slot, and $\rho=\{\rho_m(t)|m\in M, t\in T\}$ represents the task allocation ratio of each user in each time slot; constraints (C1) and (C2) represent that in each time slot, one user is only able to select one base station to access and only occupy one channel; constraint (C3) represents that one channel of one base station is only used by at most one user within one time slot; constraint (C4) represents that the average time of the expected value $E[S_m(t)]$ of sensing failure event of the user is less than a certain set value δ, that is, the long-term sensing failure rate of users is below a certain threshold; constraint (C5) represents that each user task are required to complete within the maximum time delay $D_m(t)$; constraint (C6) represents that each user task in each time slot is arbitrarily divided between the minimum value $\rho_{min}$ and 1; constraint (C7) represents that variables of the base station selection and the channel allocation are binary variables;
transforming the optimization problem P1 into an optimization problem P2 through Lyapunov optimization theory:

$$P2: \min_{A(t),B(t),\rho(t)} z + \sum_{m\in M} Q_m(t)S_m(t) + V\sum_{m\in M} U_m(t)$$

-continued $$\text{s.t.} \sum_{n \in N} a_m^n(t) = 1, \forall m \in M \quad (C1)$$

$$\sum_{l \in L} b_m^l(t) = 1, \forall m \in M \quad (C2)$$

$$\sum_{m \in M} a_m^n(t) b_m^l(t) = 1, \forall n \in N, l \in L \quad (C3)$$

$$T_m(t) \le D_m(t), \forall m \in M, t \in T \quad (C5)$$

$$\rho_m(t) \in [\rho_{min}, 1], \forall m \in M, t \in T \quad (C6)$$

$$a_m^n(t), b_m^l(t) \in \{0, 1\}, \forall m \in M, n \in N, l \in L, t \in T \quad (C7)$$

wherein, $Q_m(t)$ is the virtual queue backlog of the user m in the time slot t, $S_m(t)$ is the sensing failure event of the user m in time slot t, $z=\frac{1}{2}(M+M\delta^2)$ is a constant, and V is the control parameter that balances the stability of virtual queues with the sum of user cost functions;

solving the optimization problem P2 to obtain the values of the base station selection $a_m^n(t)$ and channel allocation $b_m^l(t)$ corresponding to the current matching of the user;

after the base station selection of the user and the channel allocation are determined, simplifying the optimization problem P2 into an optimization problem P2.1:

$$P2.1: \min_{\rho(t)} z + \sum_{m \in M} Q_m(t) S_m(t) + V \sum_{m \in M} U_m(t)$$

$$\text{s.t. } T_m(t) \le D_m(t), \forall m \in M \quad (C5)$$

$$\rho_m(t) \in [\rho_{min}, 1], \forall m \in M \quad (C6)$$

solving the optimization problem P2.1 to obtain the user task offloading ratio under the current matching;
let $F_0 = 1 - D_m(t) f_{m,local} / C_m(t)$, $$F_1 = D_m(t) \Big/ \left( \frac{I_m(t)}{R_m^{Tr}(t)} + \frac{C_m(t)}{f_m(t)} \right),$$

when $F_0 > F_1$ or $F_1 < \rho_{min}$, there is no solution to the problem P2.1, otherwise, there is an optimal solution of the problem P2.1, i.e. the user task offloading ratio, expressed as:

$$\rho_m^*(t) = \begin{cases} \max\{F_0, \rho_{min}\}, & \text{if } F_2 \ge 0 \text{ and } F_3 < \rho_{min} \\ \max\{1, F_1\}, & \text{if } F_2 < 0 \text{ and } F_3 < \rho_{min} \\ \rho_{m,1}(t), & \text{if } F_3 \ge \rho_{min} \text{ and } f_1(m, t) \le f_2(m, t) \\ \rho_{m,2}(t), & \text{if } F_3 \ge \rho_{min} \text{ and } f_1(m, t) \ge f_2(m, t) \end{cases}$$

wherein $$F_2 = \alpha \left( \frac{I_m(t)}{R_m^{Tr}(t)} + \frac{C_m(t)}{f_m(t)} \right) - \beta K s C_m(t) f_{m,local}^2 + \beta \frac{P_m I_m(t)}{R_m^{Tr}(t)}$$

$$F_3 = \frac{C_m(t)}{f_{m,local}} \Big/ \left( \frac{C_m(t)}{f_{m,local}} + \frac{C_m(t)}{f_m(t)} + \frac{I_m(t)}{R_m^{Tr}(t)} \right)$$

$$F_4 = \beta \frac{P_m I_m(t)}{R_m^{Tr}(t)} - \beta K C_m(t) f_{m,local}^2 - \alpha \frac{C_m(t)}{f_{m,local}}$$

$$\rho_{m,1}(t) = \begin{cases} \max\{\rho_{min}, F_0\}, & \text{if } F_4 \ge 0 \\ \min\{F_1, F_3, 1\}, & \text{if } F_4 < 0 \end{cases}$$

-continued $$\rho_{m,2}(t) = \begin{cases} \max\{F_0, \rho_{min}, F_3\}, & \text{if } F_2 \ge 0 \\ \min\{1, F_1\}, & \text{if } F_2 < 0 \end{cases}$$

$$f_1(m, t) = \alpha(1 - \rho_{m,1}(t)) C_m(t) / f_{m,local} +$$
$$\beta\left((1 - \rho_{m,1}(t)) K C_m(t) f_{m,local}^2 + P_m \rho_{m,1}(t) I_m(t) / R_m^{Tr}(t)\right)$$

$$f_2(m, t) = \alpha \left( \frac{\rho_{m,2}(t) I_m(t)}{R_m^{Tr}(t)} + \frac{\rho_{m,2}(t) C_m(t)}{f_m(t)} \right) +$$
$$\beta\left((1 - \rho_{m,2}(t)) K C_m(t) f_{m,local}^2 + P_m \rho_{m,2}(t) I_m(t) / R_m^{Tr}(t)\right)$$

based on the user task offloading ratio obtained from the solution, computing the the preference value of the user to the base station-channel pair and the preference value of the base station-channel pair to the user under the current matching;

the preference value $P_m(v,t)$ of the user m∈M to the base station-channel pair under the current matching v in the time slot t is:

$$P_m(v,t) = \text{indicator}_{\{Iv_m(t)=1\}} * (\eta - (z + Q_m(t) S_m(t) + V U_m(t)))$$

wherein, $Iv_m(t)=1$ indicates that the user m has a solution to the inner layer problem in the time slot t, that is, the maximum time delay constraint is satisfied. otherwise $Iv_m(t)$ is taken 0, and η is a positive number with a very large order of magnitude;

the preference values $P_y(v,t)$ for users in the current matching v of the base station-channel pair in the time slot t are:

$$P_y(v, t) = \sum_{m \in M} P_m(v, t).$$

S3. performing an swap matching based on the initial matching result to obtain an swap matching result.

Figure 3:
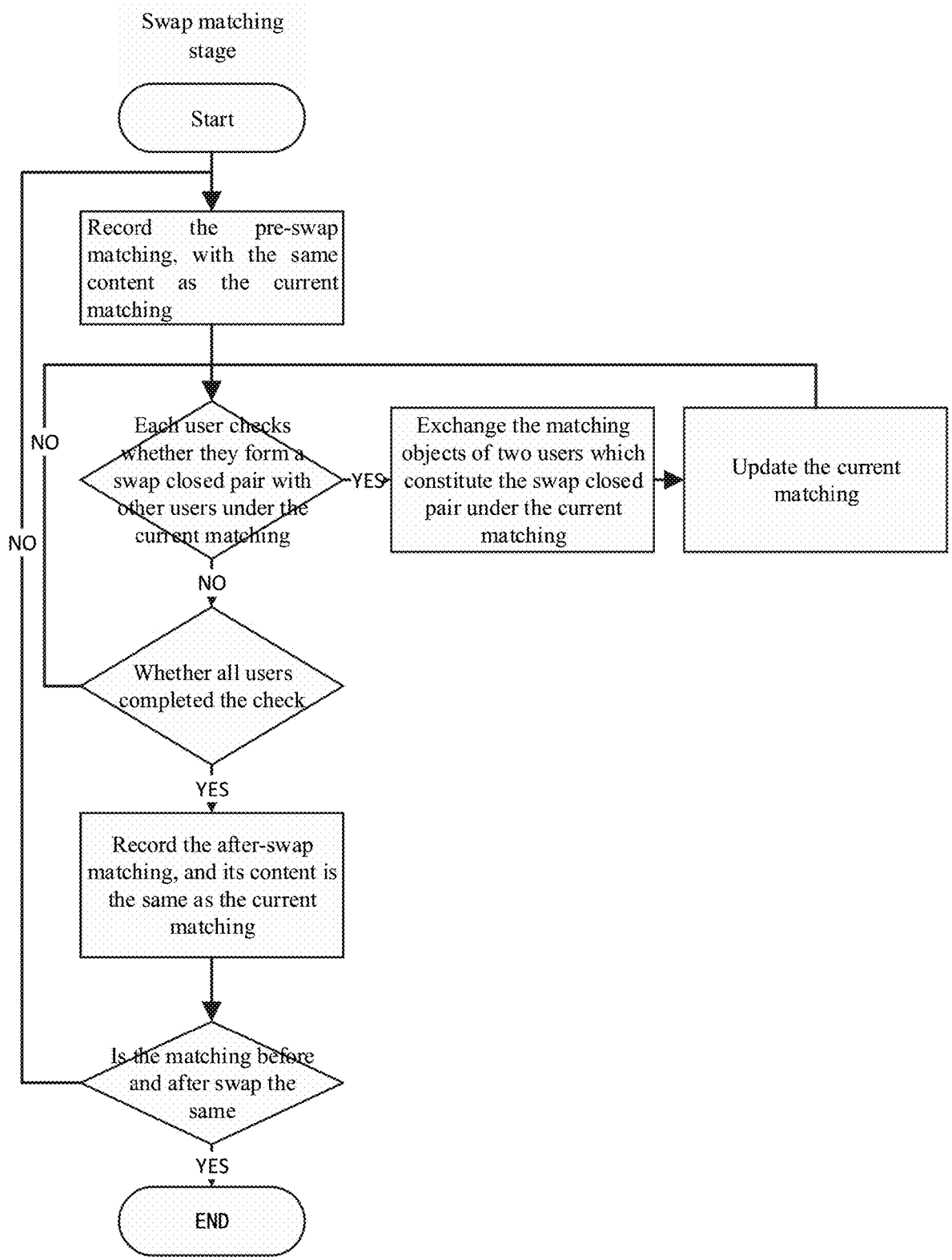
FIG. 3 is a flowchart illustrating the swap matching stage according to an embodiment of the present disclosure.

In some embodiments, as shown in FIG. 3, performing an swap matching specifically includes:

S3.1. recording the current matching as a pre-swap matching, and starting a round of swap matching;

S3.2. performing detection of a swap closed pair on all base station-channel pairs in a certain order for the current matched users;

S3.3. if any two users satisfy the swap closed pair, swapping the base station-channel pair matched by the two users;

S3.4. updating the current matching;

S3.5. completing one round of swap matching when all users have completed detection, and recording the current matching as an after-swap matching;

S3.6. repeating steps S3.1-S3.5 until the pre-swap matching and the after-swap matching of each round of swap is the same, and the swap matching is completed to obtain the swap matching result.

S4. determining an user base station selection, a channel allocation, and a task offloading ratio of the current time slot based on the swap matching result.

Further, the detection method of swap closed pair in step S3.2 includes:

under the current matching, setting two users swap the matched base station-channel pairs, while other users maintain the current matched base station-channel pairs;

if after the two users swap the matched base station-channel pairs, both of the preference values of the user to the base station-channel pair and the preference values of base station-channel pair to the user increase, then these two users satisfy the current matched swap closed pair.

It should be noted that in some embodiments, the preset period is a length of one time slot.

The present disclosure provides a method for offloading decision and resource allocation based on integration of communication, sensing, and computing. A system cost function is defined by comprehensively considering energy consumption, time delay, and migration costs. Under the constraints of user sensing failure rate and maximum task completion time delay, a long-term average cost minimization problem for users is established. Based on Lyapunov optimization theory, a virtual queue is established to evaluate the user sensing performance. By using Lyapunov drift-plus-penalty function, the long-term stochastic optimization problem is transformed into a deterministic optimization problem with a single time slot. The transformed problem is divided into two layers: inner and outer. The inner layer obtains the optimal task offloading ratio for each user base station selection and channel allocation through theoretical derivation. The outer layer determines the user base station selection and channel allocation based on the results of solving the inner layer problem through matching theory.

The method effectively reduces user energy consumption while reducing task completion time delay, while also ensuring sensing performance.

Embodiment 2

In the second aspect, this embodiment provides an offloading decision and resource allocation device based on integration of communication, sensing and computing, including a processor and a storage medium;

The storage medium is configured to store instructions;

The processor is configured to operate according to the instructions to execute the steps of the method according to the embodiment 1.

Embodiment 3

The third aspect, this embodiment provides a storage medium on which a computer program is stored, and the steps of implementing the method described in the embodiment 1 when the computer program is executed by the processor.

Embodiment 4

The fourth aspect, the present disclosure provides a computing device including:

One or more processors, one or more memories, and one or more programs, wherein one or more programs are stored in the one or more memories and configured to be executed by the one or more processors, and the one or more programs including instructions for executing any one of the methods described in the embodiment 1.

The skilled person in the art should understand that embodiments of this application may be provided as methods, systems, or computer program products. Thus, this application may take the form of a complete hardware embodiment, a complete software embodiment, or a combination of software and hardware embodiments. Moreover, this application may take the form of a computer program product implemented on one or more computer available storage media (including but not limited to disk storage, CD-ROM, optical storage, etc.) containing computer available program code.

This application is described with reference to the flowchart and/or block diagram of the method, device (system), and computer program product according to the embodiments of this application. It should be understood that each process and/or block in the flowchart and/or block diagram can be implemented by computer program instructions, as well as the combination of processes and/or blocks in the flowchart and/or block diagram. These computer program instructions can be provided to processors of general-purpose computers, specialized computers, embedded processors, or other programmable data processing devices to generate a machine that generates instructions executed by processors of computers or other programmable data processing devices to implement the functions specified in one or more processes and/or blocks in a flowchart.

These computer program instructions can also be stored in computer-readable memory that can guide computers or other programmable data processing devices to work in a specific way, so that the instructions stored in the computer-readable memory generate a manufacturing product including an instruction device that implements the functions specified in one or more processes and/or blocks in a flowchart.

These computer program instructions can also be loaded onto computers or other programmable data processing devices to perform a series of operational steps on the computer or other programmable devices to generate computer-implemented processing, therefore, the instructions executed on the computer or other programmable devices provide steps for implementing the functions specified in one or more processes and/or blocks in a flowchart.

The embodiments of the present disclosure have been described in detail in conjunction with the accompanying drawings, but the present disclosure is not limited to the aforementioned embodiments. Within the scope of knowledge possessed by ordinary skilled person in the art, various modifications can be made without departing from the scope of the present disclosure.

What is claimed is:

1. A method for offloading decision and resource allocation based on integration of communication, sensing and computing, characterized in that, following steps are executed according to a preset cycle:

S1. obtaining a location, a channel status, a task data volume, a virtual queue backlog of each user in a current time slot, and an user base station selection from a previous time slot of each user, wherein each channel of each base station is recorded as a base station-channel pair, and when an user accesses one channel of one base station, recording as a mutual matching between the user and the base station-channel pair;

S2. based on the location, the channel status, the task data volume, the virtual queue backlog of each user in the current time slot, and the user base station selection in the previous time slot of each user, performing an initial matching according to a preference value of the user to the base station-channel pair and a preference value of the base station-channel pair to the user to obtain an initial matching result;

S3. performing an swap matching based on the initial matching result to obtain an swap matching result;

S4. determining an user base station selection, a channel allocation, and a task offloading ratio of the current time slot based on the swap matching result.

2. The method for offloading decision and resource allocation based on integration of communication, sensing and computing according to claim 1, wherein performing an initial matching according to a preference value of the user to the base station-channel pair and a preference value of the base station-channel pair to the user of S2, comprising:

S2.1. setting an initial matched user set as an empty set, an initial unmatched user set as a set consisting of all users, an initial current matching set as an empty set, an initial unmatched base station-channel pair set as a set consisting of each channel of each base station, and an initial matched base station-channel pair set as an empty set;

S2.2. computing the preference values of the users to all unmatched base station-channel pairs in a certain order under the current matching, and sending a matching request to the unmatched base station-channel pair with the highest preference value;

S2.3. computing the preference values of all unmatched base station-channel pairs to each requesting user in a certain order under the current matching, the unmatched base station-channel pair accepts the matching request from the user with the highest preference value to reaching an initial matching;

S2.4. updating the current matching, the matched user set, the unmatched user set, the unmatched base station-channel pair set, and the matched base station-channel pair set;

S2.5. repeating steps S2.2-S2.4 until all users are matched with a certain base station-channel pair, then an initial matching stage is end, and the initial matching result is obtained, wherein the initial matching result comprises: the current matching set, the matched user set, the unmatched user set, the unmatched base station-channel pair set, and the matched base station-channel pair set.

3. The method for offloading decision and resource allocation based on integration of communication, sensing and computing according to claim 1, wherein performing an swap matching based on the initial matching result to obtain an swap matching result of S3 comprises:

S3.1. recording the current matching as a pre-swap matching, and starting a round of swap matching;

S3.2. performing detection of a swap closed pair on all base station-channel pairs in a certain order for the current matched users;

S3.3. if any two users satisfy the swap closed pair, swapping the base station-channel pairs matched by the two users;

S3.4. updating the current matching;

S3.5. completing one round of swap matching when all users have completed detection, and recording the current matching as an after-swap matching;

S3.6. repeating steps S3.1-S3.5 until the pre-swap matching and the after-swap matching of each round of swap is the same, and the swap matching is completed to obtain the swap matching result.

4. The method for offloading decision and resource allocation based on integration of communication, sensing and computing according to claim 1, wherein obtaining the location, the channel status, the task data volume, and the virtual queue backlog of each user in the current time slot in step S1 comprises:

S1.1. there are a total of N of base stations, M of users, and L of channels in the system, wherein a set of base stations is represented as N={1, 2, 3 . . . , N}, a set of users is represented as M={1,2,3, . . . , M}, and a set of channels is represented as L={1, 2, 3 . . . , L}; when the user is in a movement state, to represent the movement of the user, time is discretized into time slots, and a length of one time slot is τ; assuming that the position of the user remains unchanged within one time slot and varies in different time slots; the time slot are represented as a set T={1,2,3, . . . , t, . . . }; each user has a service consisting of a series of tasks, and an exclusive virtual machine or container is built on an edge server to process generated tasks; as the user moves, the virtual machine or the container migrates with the switching of the base station to which the user is accessed; the user generates one task in each time slot, and the amount of data required for communication in the task generated in the time slot t from the user m is represented as $I_m(t)$; the task computation load is represented as $C_m(t)$; the task requesting maximum time delay is represented as $D_m(t)$, and $D_m(t) \leq \tau$; the task offloading ratio is represented as $\rho_m(t)$, and $\rho_m(t) \in [\rho_{min}, 1]$; a portion of the task is calculated locally, and a portion is calculated at the base station; the user accesses to one base station at every time slot to offload task data; the users are able to use integrated signals of communication and sensing to sense the surrounding environment when transmitting task data to the base station in each time slot; all base stations share the same multiple channels, and both large-scale fading and small-scale fading of the channels are considered at the same time;

S1.2. $a_m^n(t)$ denotes the association between the user m and the base station n in the time slot t, when the user m accesses the base station n in the time slot t, $a_m^n(t)=1$, otherwise $a_m^n(t)$ is 0; all base stations share L of channels, a bandwidth of each channel is equal as W, and the signals of users using the same channel interfere with each other; $b_m^l(t)$ denotes the usage of the user m of the channel l during the time slot t, when the user occupies the channel l during the time slot t, $b_m^l(t)=1$, otherwise $b_m^l(t)$ is 0; users are only accessed to one base station in one time slot, occupying one channel;

S1.3. using the conditional mutual information between echo signals and channel pulse responses to measure the user sensing performance of the surrounding environment, and the conditional mutual information $MI_m(t)$ of user m in the time slot t is represented as:

$$MI_m(t) = \sum_{l \in L} b_m^l(t) \frac{1}{2} K T_s W \log_2\left(1 + \Gamma_m^l(t)\right)$$

wherein, $\Gamma_m^l(t)$ denotes the radar signal-to-noise ratio of the user m on the channel l of the time slot t, expressed as:

$$\Gamma_m^l(t) = \frac{P_m K T_s^2 |V_m^l(f^l)|^2}{\sum_{m' \in M \square \{m\}} b_{m'}^l(t) P_{m'} h_{m'n}^l(t) + \sigma^2}$$

wherein, $P_m$ denotes the transmission power of the user m; K denotes the number of symbols in the integrated signal; $T_s$ denotes the duration of one symbol, $V_m^l(f^l)$ denotes the Fourier transform of the channel pulse response at the frequency $f^l$ of the channel l, following a standard normal distribution; $h_{m',m}^l(t)$ denotes the channel gain between user m' and the user m on the channel l; and $\sigma^2=N_0W$ denotes the power of additive Gaussian white noise in the channel;

when the user mutual information is less than the set threshold value $MI_{min}$, sensing fails, expressed as:

$$S_m(t)=\text{indicator}_{\{MI_m(t)<MI_{min}\}}$$

wherein $\text{indicator}_{\{x\}}$ denotes an indicator function, that is, when the expression x is true, the value of the indicator function is 1, otherwise it is 0;

S1.4. for sensing failure event $S_m(t)$ of the user m in the time slot t, defining a corresponding virtual queue with an initial value of 0, and representing the backlog of each queue as $Q_m(t)$, wherein $Q_m(0)=0$, $S_m(t)$ denotes the increase of virtual queues in the time slot t, and $\delta$ denotes the decrease of virtual queues; the virtual queue backlog of the user m in time slot t+1 satisfies the following expression:

$$Q_m(t+1)=[Q_m(t)+S_m(t)-\delta]^+.$$

5. The method for offloading decision and resource allocation based on integration of communication, sensing and computing according to claim 1, wherein a method for computing the preference values of the user to all unmatched base station-channel pairs in a certain order under the current matching in step S2 comprises:

the data transmission rate $R_m^{Tr}(t)$ at which the user m offloads tasks to the base station during the time slot t is expressed as:

$$R_m^{Tr}(t) = \sum_{n\in N}\sum_{l\in L} a_m^n(t)b_m^l(t)W\log_2\left(1+\frac{P_m h_{m,n}^l(t)}{\sum_{m'\in M\square\{m\}} b_{m'}^l(t)P_{m'}h_{m',n}^l(t)+\sigma^2}\right)$$

wherein, $h_{m',m}^l(t)$ denotes the channel gain between the user m' and the base station n on the channel l, and $$\sum_{m'\in M\square\{m\}} b_{m'}^l(t)P_{m'}h_{m',n}^l(t)$$

denotes the interference caused by other users using the same channel to the user m;

the time $T_m^{Tr}(t)$ for the user m to transmit tasks in the time slot t is expressed as:

$$T_m^{Tr}(t) = \frac{I_m(t)\rho_m(t)}{R_m^{Tr}(t)}$$

the energy consumption $E_m^{Tr}(t)$ of the user m transmitting tasks in the time slot t is expressed as:

$$E_m^{Tr}(t)=P_m T_m^{Tr}(t)$$

using $f_{m,local}$ to represent the computing power of the user m, the local computation time delay $T_m^{local}(t)$ of the user m for tasks in the time slot t is:

$$T_m^{local}(t) = \frac{C_m(t)(1-\rho_m(t))}{f_{m,local}}$$

the local task computation energy consumption $E_m^{local}(t)$ of the user m in the time slot t is:

$$E_m^{local}(t)=K(1-\rho_m(t))C_m(t)f_{m,local}^2$$

wherein, K refers to the power coefficient;

after receiving the task transmitted by the user, the base station divides all computing resources equally among the computing tasks of all users, and the computing resource m allocated to the user m by the base station n in the time slot t is:

$$f_m^n(t) = \frac{a_m^n(t)F_n}{\sum_{m\in M} a_m^n(t)}$$

the computing resource $f_m(t)$ obtained by the user m in the time slot t is expressed as:

$$f_m(t) = \sum_{n\in N} f_m^n(t)$$

the task computation time delay $T_m^{com}(t)$ for the user m in the time slot t is expressed as:

$$T_m^{com}(t) = \frac{C_m(t)\rho_m(t)}{f_m(t)}$$

the task processing time delay $T_m(t)$ of the user m in the time slot t is the maximum value of the local computation time delay and the base station computation time delay, expressed as:

$$T_m(t)=\max\{T_m^{local}(t), T_m^{Tr}(t)+T_m^{com}(t)\}$$

the energy consumption $E_m(t)$ of the user m processing tasks in the time slot t is expressed as:

$$E_m(t)=E_m^{local}(t)+E_m^{Tr}(t)$$

the migration cost for the user m in the time slot t is expressed as:

$$c_m^{mi}(t) = \sum_{n\in N} \frac{\varepsilon}{2}[(1-a_m^n(t-1))a_m^n(t)+(1-a_m^n(t))a_m^n(t-1)]$$

wherein, $\varepsilon$ denotes the cost of migration, which is a fixed value; when the base station selections selected by the user of the current time slot and the previous time slot are different, there is a migration cost $\varepsilon$, otherwise there is no cost;

the cost function $U_m(t)$ of the user m in the time slot t is expressed as:

$$U_m(t)=\alpha T_m(t)+\beta E_m(t)+c_m^{mi}(t)$$

wherein, $\alpha, \beta$ are the weight coefficients of time delay and energy consumption, respectively;

establishing an optimization problem P1 that minimize long-term user costs:

$$P1: \min_{A,B,\rho i\to\infty}\lim \frac{\sum_{t=1}^{i}\sum_{m\in M} E[U_m(t)]}{i}$$

-continued $$\text{s.t.} \sum_{n \in N} a_m^n(t) = 1, \forall\, m \in M, t \in T \quad (C1)$$

$$\sum_{l \in L} b_m^l(t) = 1, \forall\, m \in M, t \in T \quad (C2)$$

$$\sum_{m \in M} a_m^n(t) b_m^l(t) = 1, \forall\, n \in N, l \in L, t \in T \quad (C3)$$

$$\lim_{i \to \infty} \frac{\sum_{t=1}^{i} E[S_m(t)]}{i} \leq \delta, \forall\, m \in M \quad (C4)$$

$$T_m(t) \leq D_m(t), \forall\, m \in M, t \in T \quad (C5)$$

$$\rho_m(t) \in [\rho_{min}, 1], \forall\, m \in M, t \in T \quad (C6)$$

$$a_m^n(t), b_m^l(t) \in \{0,1\}, \forall\, m \in M, n \in N, l \in L, t \in T \quad (C7)$$

wherein, the variable set $A=\{a_m^n(t)|m \in M, n \in N, t \in T\}$ represents the access situation of each user to each base station in each time slot, $B=\{b_m^l(t)|m \in M, l \in L, t \in T\}$ represents the occupation situation of each channel by each user in each time slot, and $\rho=\{\rho_m(t)|m \in M, t \in T\}$ represents the task allocation ratio of each user in each time slot; constraints (C1) and (C2) represent that in each time slot, one user is only able to select one base station to access and only occupy one channel; constraint (C3) represents that one channel of one base station is only used by at most one user within one time slot; constraint (C4) represents that the average time of the expected value $E[S_m(t)]$ of sensing failure event of the user is less than a certain set value $\delta$, that is, the long-term sensing failure rate of the user is below a certain threshold; constraint (C5) represents that each user task are required to complete within the maximum time delay $D_m(t)$; constraint (C6) represents that each user task in each time slot is arbitrarily divided between the minimum value $\rho_{min}$ and 1; constraint (C7) represents that variables of the base station selection and the channel allocation are binary variables;

transforming the optimization problem P1 into an optimization problem P2 through Lyapunov optimization theory:

$$P2: \min_{A(t),B(t),\rho(t)} z + \sum_{m \in M} Q_m(t) S_m(t) + V \sum_{m \in M} U_m(t)$$

$$\text{s.t.} \sum_{n \in N} a_m^n(t) = 1, \forall\, m \in M \quad (C1)$$

$$\sum_{l \in L} b_m^l(t) = 1, \forall\, m \in M \quad (C2)$$

$$\sum_{m \in M} a_m^n(t) b_m^l(t) = 1, \forall\, n \in N, l \in L \quad (C3)$$

$$T_m(t) \leq D_m(t), \forall\, m \in M \quad (C5)$$

$$\rho_m(t) \in [\rho_{min}, ,], \forall\, m \in M \quad (C6)$$

$$a_m^n(t), b_m^l(t) \in \{0,1\}, \forall\, m \in M, n \in N, l \in L \quad (C7)$$

wherein, $Q_m(t)$ is the virtual queue backlog of the user m in the time slot t, $S_m(t)$ is the sensing failure event of the user m in time slot t, $z=\frac{1}{2}(M+M\delta^2)$ is a constant, and V is the control parameter that balances the stability of virtual queues with the sum of user cost functions;

solving the optimization problem P2 to obtain the values of the base station selection $a_m^n(t)$ and channel allocation $b_m^l(t)$ corresponding to the current matching of the user;

after the base station selection of the user and the channel allocation are determined, simplifying the optimization problem P2 into an optimization problem P2.1:

$$P2.1: \min_{\rho(t)} z + \sum_{m \in M} Q_m(t) S_m(t) + V \sum_{m \in M} U_m(t)$$

$$\text{s.t.} T_m(t) \leq D_m(t), \forall\, m \in M \quad (C5)$$

$$\rho_m(t) \in [\rho_{min}, 1], \forall\, m \in M \quad (C6)$$

solving the optimization problem P2.1 to obtain the user task offloading ratio under the current matching;

let $F_0 = 1 - D_m(t) f_{m,local} / C_m(t)$, $$F_1 = D_m(t) \bigg/ \left( \frac{I_m(t)}{R_m^{Tr}(t)} + \frac{C_m(t)}{f_m(t)} \right), \text{ when } F_0 > F_1 \text{ or } F_1 < \rho_{min},$$

there is no solution to the problem P2.1, otherwise, there is an optimal solution of the problem P2.1, i.e. the user task offloading ratio, expressed as:

$$\rho_m^*(t) = \begin{cases} \max\{F_0, \rho_{min}\}, & \text{if } F_2 \geq 0 \text{ and } F_3 < \rho_{min} \\ \max\{1, F_1\}, & \text{if } F_2 < 0 \text{ and } F_3 < \rho_{min} \\ \rho_{m,1}(t), & \text{if } F_3 \geq \rho_{min} \text{ and } f_1(m,t) \leq f_2(m,t) \\ \rho_{m,2}(t), & \text{if } F_3 \geq \rho_{min} \text{ and } f_1(m,t) \geq f_2(m,t) \end{cases}$$

wherein $$F_2 = \alpha \left( \frac{I_m(t)}{R_m^{Tr}(t)} + \frac{C_m(t)}{f_m(t)} \right) - \beta K S C_m(t) f_{m,local}^2 + \beta \frac{P_m I_m(t)}{R_m^{Tr}(t)}$$

$$F_3 = \frac{C_m(t)}{f_{m,local}} \bigg/ \left( \frac{C_m(t)}{f_{m,local}} + \frac{C_m(t)}{f_m(t)} + \frac{I_m(t)}{R_m^{Tr}(t)} \right)$$

$$F_4 = \beta \frac{P_m I_m(t)}{R_m^{Tr}(t)} - \beta K C_m(t) f_{m,local}^2 - \alpha \frac{C_m(t)}{f_{m,local}}$$

$$\rho_{m,1}(t) = \begin{cases} \max\{\rho_{min}, F_0\}, & \text{if } F_4 \geq 0 \\ \min\{F_1, F_3, 1\}, & \text{if } F_4 < 0 \end{cases}$$

$$\rho_{m,2}(t) = \begin{cases} \max\{F_0, \rho_{min}, F_3\}, & \text{if } F_2 \geq 0 \\ \min\{1, F_1\}, & \text{if } F_2 < 0 \end{cases}$$

$$f_1(m,t) = \alpha(1 - \rho_{m,1}(t)) C_m(t) / f_{m,local} +$$
$$\beta\big((1 - \rho_{m,1}(t)) K C_m(t) f_{m,local}^2 + P_m \rho_{m,1}(t) I_m(t) / R_m^{Tr}(t)\big)$$

$$f_2(m,t) = \alpha \left( \frac{\rho_{m,2}(t) I_m(t)}{R_m^{Tr}(t)} + \frac{\rho_{m,2}(t) C_m(t)}{f_m(t)} \right) +$$
$$\beta\big((1 - \rho_{m,2}(t)) K C_m(t) f_{m,local}^2 + P_m \rho_{m,2}(t) I_m(t) / R_m^{Tr}(t)\big)$$

based on the user task offloading ratio obtained from the solution, computing the the preference value of the user to the base station-channel pair and the preference value of the base station-channel pair to the user under the current matching;

the preference value $P_m(v,t)$ of the user $m \in M$ to the base station-channel pair under the current matching v in the time slot t is:

$$P_m(v,t) = \text{indicator}_{\{v_m(t)=1\}} * (\eta - (z + Q_m(t) S_m(t) + V U_m(t)))$$

wherein, $Iv_m(t)=1$ indicates that the user m has a solution to the inner layer problem in the time slot t, that is, the maximum time delay constraint is satisfied. otherwise $Iv_m(t)$ is taken 0, and η is a positive number with a very large order of magnitude;

the preference values $P_y(v,t)$ for the user in the current matching v of the base station-channel pair in the time slot t are:

$$P_y(v, t) = \sum_{m \in M} P_m(v, t).$$

6. The method for offloading decision and resource allocation based on integration of communication, sensing and computing according to claim 3, wherein performing detection of a swap closed pair on all base station-channel pairs in a certain order for the current matched users in step S3.2 comprises:

under the current matching, setting two users swap the matched base station-channel pairs, while other users maintain the current matched base station-channel pairs;

if after the two users swap the matched base station-channel pairs, both of the preference value of the user to the base station-channel pair and the preference value of the base station-channel pair to the user increase, then these two users satisfy the current matched swap closed pair.

7. The method for offloading decision and resource allocation based on integration of communication, sensing and computing according to claim 1, wherein the preset cycle is a length of one time slot.

8. A device for offloading decision and resource allocation based on integration of communication, sensing and computing, comprising a processor and a storage medium;

wherein the storage medium is configured to store instructions; and the processor is configured to operate according to the instructions to execute the steps of the method according to claim 1.

9. A non-transitory storage medium on which a computer program is stored, characterized in that the steps of the methods according to claim 1 are implemented when the computer program is executed by a processor.

10. A computing device, comprising:

one or more processors, one or more memories, and one or more programs, wherein one or more programs are stored in the one or more memories and configured to be executed by the one or more processors, and the one or more programs comprising instructions for executing the methods according to claim 1.

* * * * *